United States Patent [19]

Reafler et al.

[11] Patent Number: 5,215,811
[45] Date of Patent: Jun. 1, 1993

[54] PROTECTIVE AND DECORATIVE SHEET MATERIAL HAVING A TRANSPARENT TOPCOAT

[75] Inventors: Gerald G. Reafler, Rochester, N.Y.; Marvis E. Hartman, Pittsburgh, Pa.

[73] Assignee: Eastman Kodak Company, Rochester, N.Y.

[21] Appl. No.: 601,804

[22] PCT Filed: Apr. 27, 1989

[86] PCT No.: PCT/US89/01779

§ 371 Date: Dec. 20, 1990

§ 102(e) Date: Dec. 20, 1990

Related U.S. Application Data

[63] Continuation-in-part of Ser. No. 187,121, Apr. 28, 1988, abandoned.

[51] Int. Cl.$^5$ .............................................. B32B 7/02
[52] U.S. Cl. .................................... 428/212; 428/31; 428/213; 428/216; 428/328; 428/336; 428/354; 428/423.3; 428/423.7; 428/424.2; 428/908.8
[58] Field of Search .............. 428/480, 483, 31, 328, 428/336, 343, 354, 423.3, 423.7, 424.2, 908.8, 212, 213, 216

[56] References Cited

U.S. PATENT DOCUMENTS

| | | | |
|---|---|---|---|
| 4,582,876 | 4/1986 | Weemes et al. | 525/64 |
| 4,719,132 | 1/1988 | Porter | 427/409 |
| 4,769,100 | 9/1988 | Short et al. | 156/285 |
| 4,868,030 | 9/1989 | Mentzer et al. | 428/174 |
| 4,921,755 | 5/1990 | Carroll, Jr. et al. | 428/328 |
| 5,026,448 | 6/1991 | Reafler et al. | 156/212 |
| 5,037,680 | 8/1991 | Papendick et al. | 428/31 |

Primary Examiner—Paul J. Thibodeau
Assistant Examiner—Hoa T. Le
Attorney, Agent, or Firm—William T. French; J. Jeffrey Hawley; James L. Tucker

[57] ABSTRACT

A protective and decorative polymeric sheet material for bonding to substrates by thermoforming comprises a flexible carrier film, a paint layer on one surface of the carrier film containing a colorant or light reflective flakes or both; and a transparent topcoat overlying the paint layer. At least a portion of the transparent topcoat is a rubbery cushioning layer formed of a non-crosslinked, or lightly crosslinked polymeric composition of low Tg.

The sheet material has an unextended state and is heat softenable to a plastic state in which it is extendable to an extended state at least 50% greater in area than the unextended state. The paint and topcoat layers have substantially uniform quality and appearance in both the unextended and extended states. In a preferred embodiment, the thickness of the transparent topcoat is at least 0.1 millimeter. The thick topcoat provides improved retention of gloss and distinctness of image when the sheet material is stretched. As compared with sheet material of which the topcoat layer consists entirely of crosslinked polymer of relatively high Tg, the sheet material of the invention shows a reduced tendency to peel back from the substrate when cut and subjected to high temperature.

11 Claims, 2 Drawing Sheets

PROTECTIVE AND DECORATIVE SHEET MATERIAL HAVING A TRANSPARENT TOPCOAT

RELATED APPLICATIONS

This is a continuation-in-part of application Ser. No. 07/187,121, filed Apr. 28, 1988, now abandoned.

FIELD OF THE INVENTION

This invention relates to a protective and decorative sheet material. More specifically, it relates to a flexible, thermoformable sheet material that can be bonded to various substrates, including exterior automotive panels, as a protective and decorative covering.

BACKGROUND OF THE INVENTION

The invention will be described with reference to providing protective and decorative finishes on exterior automotive panels, but it should be understood that the automobile is only one of many substrates to which the sheet material of the invention can be applied.

As pointed out in an article by Alan J. Backhouse entitled "Routes To Low Pollution Glamour Metallic Automotive Finishes", Journal of Coatings Technology, Vol. 54, No. 693, pages 83–90, October 1982, there is a growing need to reduce the amount of atmospheric pollution caused by solvents emitted during industrial painting processes. Many different approaches have been proposed. For example, efforts have been made to replace the solvent-based paints used for automobiles with water-based paints. Work has also been done on the use of high solids formulations to lessen the emission of organic solvents. However, the application of automotive finishes is a highly demanding art because of the extremely high quality of the surface finish required and because of the common application of metallic finishes to provide what Backhouse refers to as "high stylistic effects". Accordingly, past efforts to replace the low viscosity, low-solids-content paint formulations conventionally used in spray painting operations in the automotive industry have met with limited success.

A more promising approach is to eliminate entirely the need for spray painting. Elimination of spray painting, or reduction in its use, would not only reduce atmospheric pollution, but would provide cost savings in that spray painting operations are so wasteful that more than half of the paint may be wasted. A means for achieving such goal exists through the use of a preformed thermoplastic sheet material which can be bonded to the panel to provide the protective and decorative coating. Such techniques have been utilized for interior automobile panels as described, for example, in U.S. Pat. No. 3,551,232 issued Dec. 29, 1970.

The objective of U.S. Pat. No. 3,551,232 is to overcome the problems of bubbling and blistering of the resin sheet that tend to occur in the vacuum-forming process. It achieves this by use of an adhesive containing an inert particulate filler which minimizes the entrapment of air.

To employ a process of the type described in U.S. Pat. No. 3,511,232 with exterior automotive panels presents a greater challenge. The surface appearance of such panels is of critical importance, so that it is necessary not only to avoid bubbling or blistering caused by entrapped air, but to provide a protective and decorative coating that will equal or exceed the quality of a spray-painted surface. Furthermore, exterior automotive panels present a particular problem in view of the difficulty of smoothly adhering a flexible sheet material to a curved substrate and the difficulty of doing so while maintaining over the entire surface a uniform color intensity.

Efforts have been made by others to produce a paint-coated flexible and stretchable sheet material having these capabilities. In general, it is believed that these efforts have resulted in products having numerous coating defects and in which the paint layer does not have the high degree of uniformity which permits the sheet material to undergo the stresses of thermoforming and yet meet the exacting standards of an exterior automotive finish.

A new type of flexible and stretchable sheet material has been developed that is (1) capable of meeting the requirements of an exterior automotive finish and (2) capable of withstanding the stretching and bending forces involved in bonding it to exterior automotive panels. It is produced by laminar flow coating techniques which permit exacting control of the thickness and uniformity of the coatings. Such coating techniques provide essentially defect-free coatings having a substantially uniform quality and appearance.

The new type of sheet material comprises a flexible carrier film, a protective and decorative paint layer, also known as a basecoat, adhered to one surface of the carrier film, and a transparent topcoat or clearcoat over the basecoat. The carrier film has heat-softening and tensile elongation properties which adapt it to use in the thermoforming process and the paint layer and topcoat have compatible heat softening and tensile elongation properties. As a result, the sheet material can undergo substantial elongation without crazing or delamination of the layers.

The present invention provides a further improvement in the new type of sheet material, in particular, with regard to a reduction in the tendency toward elastic recovery by the stretched material.

SUMMARY OF THE INVENTION

The sheet material of the invention comprises
a flexible carrier film;
a protective and decorative paint layer adhered to one surface of the carrier film; the paint layer containing a polymeric binder and a colorant or light reflective flakes or both; and
a transparent topcoat layer overlying the paint layer. At least a portion of the transparent topcoat layer comprises a rubbery cushioning layer of a stretchable thermoformable polymeric composition which is non-crosslinked or of low crosslink density and has a Tg below about 20° C. Preferably, the latter contains the same kind of polymer as the polymeric binder of the paint layer.

The sheet material has a substantially unstressed, unextended state prior to being thermoformed and is heat softenable to a substantially plastic state in which it is thermoformable over irregular surfaces to an extended state having an area at least 50% greater than that of the unextended state. It has a substantially uniform quality and appearance both in its unextended and its extended states. In a preferred embodiment, the thickness of the topcoat layer over a metallic paint layer is at least 0.1 millimeter and the sheet material has improved retention of gloss when stretched as well as reduced tendency toward elastic recovery.

DETAILED DESCRIPTION

Figure 1:
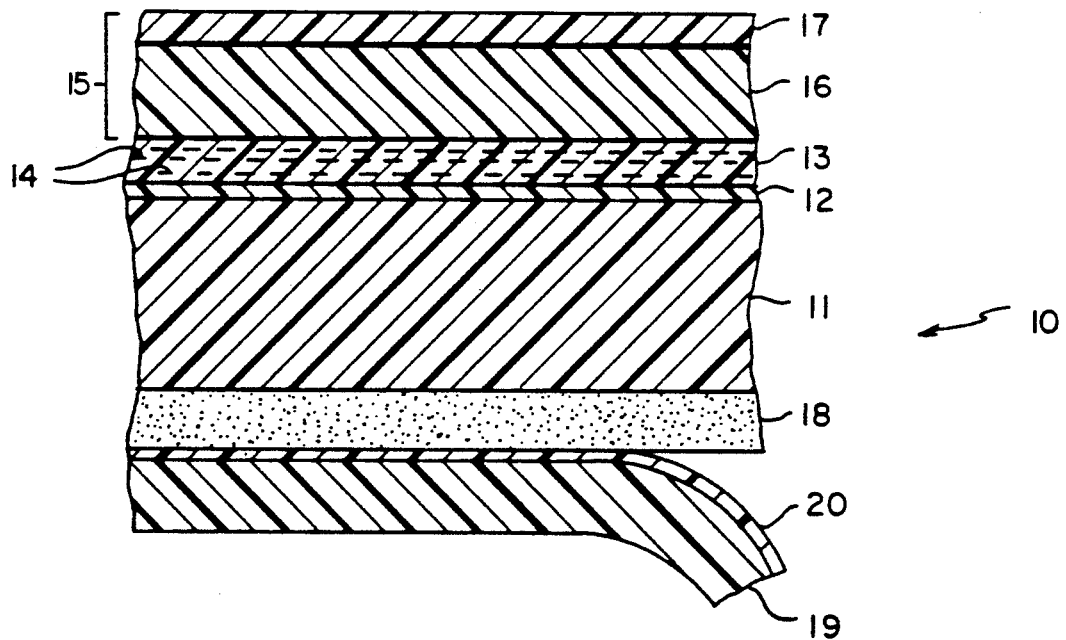

FIG. 1 of the drawings shows a sheet material 10 in accordance with the invention which comprises a flexible, thermoformable carrier film 11, a thin tie-layer 12, and a paint layer 13 which contains light-reflective flakes 14 such as aluminum flakes.

As a consequence of the laminar flow coating method by means of which the paint layer preferably is formed, (as discussed more fully hereinafter), the light reflective flakes are oriented substantially parallel to the surface of the paint layer. In the preferred embodiment, at least 75% of the flakes have an orientation within 12 degrees of parallelism with the paint layer surface.

Over the paint layer is a thick transparent topcoat layer 15, at least a portion of which is a rubbery cushioning layer. The latter is formed of a stretchable and thermoformable polymeric composition which is non-crosslinked or is of low crosslink density and has a glass transition temperature (Tg) below about 20° C.

In the preferred embodiment of FIG. 1, the transparent layer 15 comprises two layers, a cushioning layer 16 and, overlying it and forming the surface of the sheet material 10, a crosslinked transparent layer 17. The latter is of substantially higher Tg than the cushioning layer. Its Tg is at least about 40° C. It provides a relatively hard, abrasion-resistant surface for the sheet material. Preferably, it is substantially thinner than the cushioning layer.

On the opposite surface of carrier film 11 is coated an optional adhesive layer 18. This can be, for example, a pressure-sensitive or a heat-activated adhesive. An adhesive layer is desirable when the sheet material is to be bonded to substrates such as automobile parts by vacuum thermoforming. In other methods of bonding, such as the "in-mold" technique, which is a known method of laminating a thermoplastic sheet to a plastic article by fusion while molding the article, an adhesive layer is not needed.

To protect the pressure-sensitive adhesive layer, a release sheet of polyester film 19 or the like can be adhered to it and then stripped away before the sheet material is thermoformed and bonded to a substrate. An optional release coating 20, e.g., a silicone coating, can be on sheet 19 to aid in stripping it from the adhesive layer.

The rubbery cushioning layer in the transparent topcoat layer of the new sheet material provides important advantages. Foremost is the fact that it reduces the tendency of the stretched sheet material toward elastic recovery at elevated temperature. This is evidenced in a test in which the sheet material is stretched and bonded to a substrate, namely, a metal panel, by vacuum thermoforming. Then a cut or slice is made through the sheet material down to the metal. The test cut is made with a razor blade in a straight line perpendicular to the direction of strain or stretching of the sheet material. Next, the panel with the stretched and bonded sheet material is heated to 93° C. (200° F.) for one hour. After this heat treatment, the width of the cut is measured to determine the extent, if any, to which the sheet material has peeled back from the cut. The sheet material of the invention peels back much less than does a material of which the entire transparent topcoat is a higher Tg crosslinked polymer.

A characteristic of the described sheet material when the paint layer which contains light-reflective flakes such as aluminum flakes is that it tends to lose gloss when stretched beyond certain limits during thermoforming. This is true even when the sheet material has a glossy, clear, thin topcoat. However, the loss of gloss with stretching is reduced or eliminated if the transparent topcoat is made sufficiently thick. More particularly, if the topcoat is at least 0.1 millimeter (4 mils) in thickness, marked improvement occurs in the retention of gloss by such sheet material when stretched.

In accordance with the present invention, it has been found that the retention of gloss when the transparent topcoat is thick is also achieved when all or part of the thickness is provided by the rubbery cushioning layer. In addition the benefit of reducing the tendency toward elastic recovery is obtained even when the topcoat includes both the cushioning layer and an overlying crosslinked layer of higher Tg. However, since such a crosslinked layer does have "memory" when stretched, it is preferred that the crosslinked, higher Tg layer be thinner than the cushioning layer. For example, for a total topcoat thickness of 0.15 mm (6 mils) the dry thicknesses of the cushioning layer 16 and the crosslinked surface layer 17 of FIG. 1 are 0.1 and 0.05 mm, respectively (4 and 2 mils).

A surprising property of the sheet material of the invention is that, even when it has a crosslinked surface layer of substantial thickness, the sheet material still does not have excessive "memory" or elastic recovery when heated. The cushioning layer evidently lowers the tendency toward elastic recovery of the overall sheet material, while permitting the inclusion of a crosslinked layer which provides desirable surface hardness and abrasion resistance. The combination of the two types of layers provides unexpected and valuable results.

The inclusion of a rubbery, low Tg polymeric layer as all or part of the transparent topcoat layer is also believed to provide other advantages. These include improved thermoforming capability—as evidenced by less tendency to crack and better conformance to small details of the substrate surface—and improved resistance to impact damage from gravel and the like.

Figure 2:
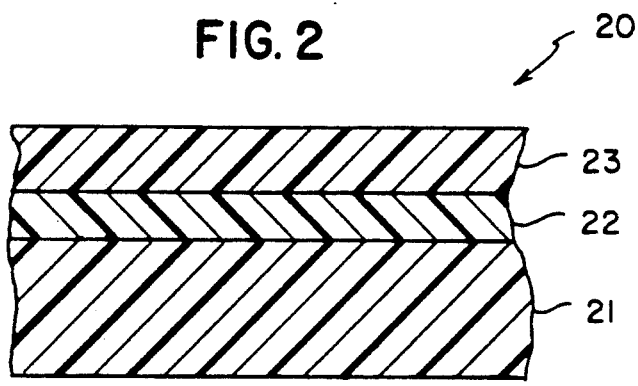
FIGS. 1 and 2 are enlarged, diagrammatic cross-sectional views of sheet material of the present invention.

FIG. 2 of the drawing shows in cross section a simpler type of sheet material 20 of the invention. It comprises a flexible and stretchable carrier film 21 on one surface of which is coated a thin, pigmented, but non-metallic paint layer 22. Over the paint layer is coated a transparent topcoat layer which, in the embodiment of FIG. 2, is composed entirely of a rubbery non-pigmented polymer of low Tg, i.e., below about 20° C. This composition forms a cushioning layer. Since this embodiment is intended for uses not requiring great abrasion resistance, a crosslinked clearcoat is not required over the cushioning layer.

In the embodiment of FIG. 2 the paint layer contains no metallic flakes and hence does not lose gloss excessively when stretched within reasonable limits during thermoforming (e.g., 50–100 percent increase in area). Accordingly, the topcoat layer can be relatively thin, i.e., less than about 0.1 millimeter in thickness. Likewise, in this embodiment as illustrated in FIG. 2 a paint composition is chosen which requires no tie layer to adhere it to the carrier film. Also this embodiment is intended for purposes not requiring adhesive bonding. Hence no adhesive layer is shown.

Figure 3:
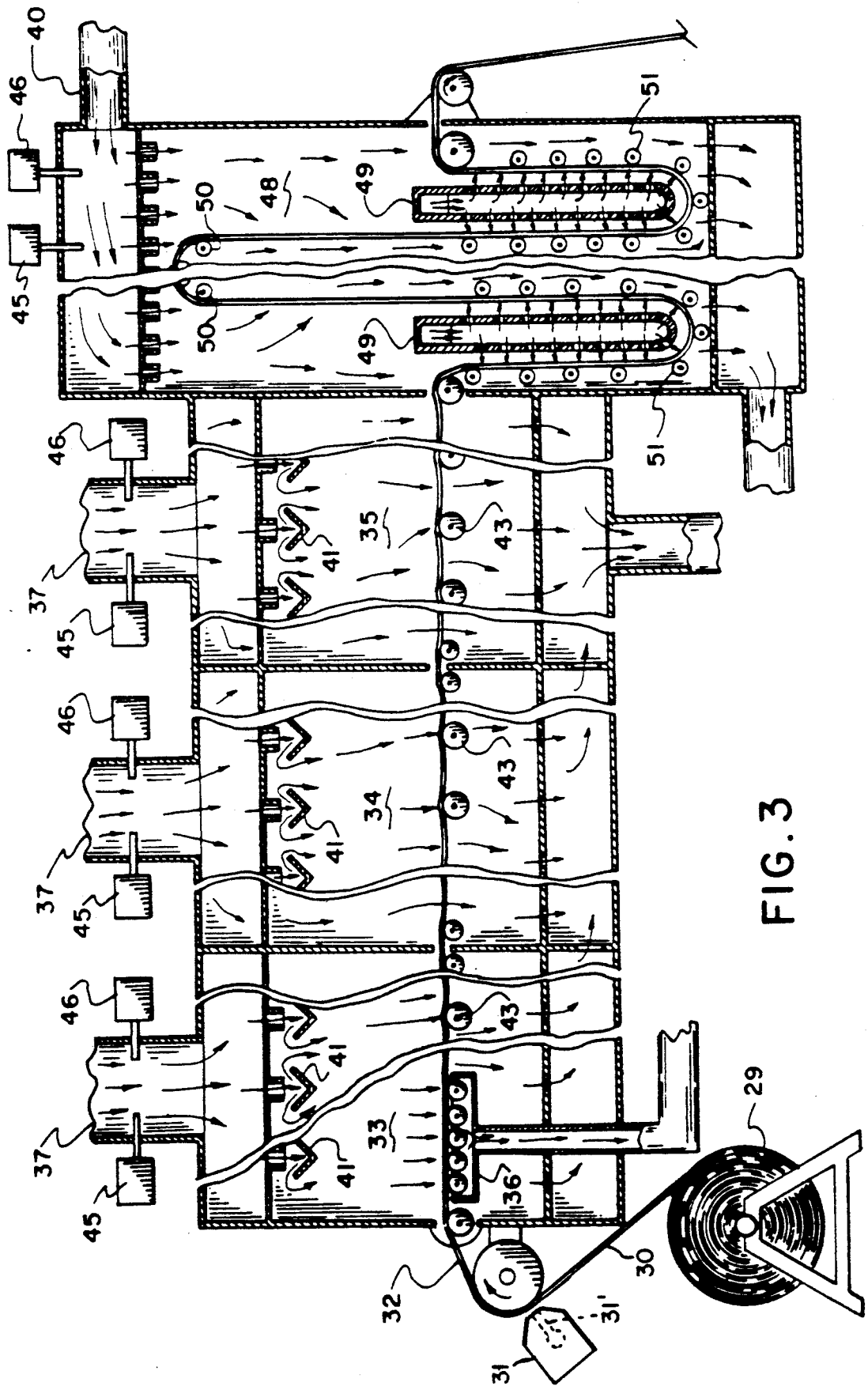
FIG. 3 is a diagrammatic side view of an apparatus for manufacturing the sheet material of the invention.

FIG. 3 illustrates diagrammatically a preferred coating and drying apparatus which can be used to manufacture the sheet material of the invention. Coating hopper 31 is an extrusion coating hopper such as the type disclosed by Beguin, U.S. Pat. No. 2,681,294. The coating hopper extrudes in laminar flow through a narrow slot a horizontally extending bead of the coating liquid in contact with the continuously moving film web 30. The coating composition is thus coated as a uniform layer onto the surface of the web. The first layer coated on the web can be tie-layer 12 or paint layer 13, as shown in FIG. 1. In either case, the carrier film web supplied by roll 29, whether or not previously coated, passes in close proximity to the narrow extrusion slot 31' of the coating hopper 31. As the web passes the hopper, a laminar flow of the coating composition is extruded on the web, the entire thickness of the coating for that particular pass being applied simultaneously across the width of the web. Promptly after being coated, the web having the wet layer on its surface is drawn through the drying apparatus.

The coated web 32 is pulled or drawn by take-up rollers not shown in the drawing through successive stages of the drying apparatus. These include initial drying stages 33, 34, 35 and final curing stage 48. Preferably the stages are at successively higher temperatures, the temperatures of the initial stages of the drying zone being mild. This is especially desirable when drying an aqueous paint which contains water and organic solvents. The final stage or stages, however, can be at high temperatures to remove residual liquids and/or to cure the crosslinkable topcoat. For example, heated air can be introduced at 27° C., 43° C. and 66° C. via lines 37 at stages 33, 34 and 35, respectively. Baffles 41 divert the air flow away from the top of the film and cause it to flow to lower regions of the drying chamber. Sensing controls 45 and 46 aid in maintaining the appropriate air temperature and humidity by feedback mechanisms not shown in the drawing. The speed of the web is such that the coating is subjected to elevated temperature for a substantial time, e.g., for 3 to 6 minutes, in the final stage 48 where the air is admitted via line 40 at about 80° C.

Preferably, the moving web is also heated from its underside by contact with metal rollers 36 and 43 and other rollers in the several drying stages. These metal rollers of high conductivity are heated by the warm air and they transfer heat to the underside of the web, thus further increasing its temperature. In the final stage 48, the web is heated to its highest temperature as it travels through a vertical path in a floating loop section, being guided by rollers 50 and air reversers of the plenums 49 to keep the coated side of the film out of contact with rollers 51. The dried film leaving stage 48 is wound on a take-up roll not shown in the drawing.

In the preferred method of applying the transparent topcoat over the paint layer, the paint layer is coated and dried and thereafter the topcoat is applied by the same laminar flow coating method as described above for applying the tie-layer and paint layer. In this method, the film having on its surface the dried paint layer is again passed in close proximity to the narrow extrusion slot of an extrusion coating hopper 31, as shown in FIG. 3, from which the topcoat composition is extruded in laminar flow. Again, as with the paint layer, the entire thickness of topcoat to be applied in the particular pass is applied simultaneously across the width of the dried paint layer. Promptly thereafter the web having the web topcoat layer on its surface is drawn through the drying apparatus.

Since the topcoat for the preferred sheet material of the invention is thick, it is preferred to coat such layers in two or more passes in order to dry them adequately. For example, if the topcoat dry thickness is to be 0.12 mm, a first pass can coat and dry a layer of 0.06 mm dry thickness and a second pass can coat and dry a second layer to raise the total dry thickness to 0.12 mm. Advantageously, the cushioning layer and the crosslinked, higher Tg layer can be coated in separate passes. For greater thickness, additional coating and drying passes can be carried out.

For optimum quality stepwise increase in drying temperatures and other procedures such as humidity control are also preferred for drying the topcoat layer.

If the drying conditions are carefully controlled, e.g., by providing small temperature increases from stage to stage and having a lengthy residence time in each stage, the entire thickness of the topcoat can be coated and dried in a single pass. However, since the topcoat is extremely thick in the preferred sheet materials of the invention, i.e., greater than 0.1 mm when dry, the best quality is obtained when the topcoat is coated and dried in two or more passes.

It is also possible to coat the topcoat simultaneously with the paint layer. This wet-on-wet method of coating can be carried out with laminar flow coating hoppers suitable for simultaneous coating of multiple layers. Examples of such coating hoppers include U.S. Pat. Nos. 2,761,419; 2,761,791 and 3,005,440. Although these simultaneous multilayer coating techniques can be used, best results are obtained when the paint layer is coated and dried separately and then successive layers of the topcoat are coated and dried in two or more separate passes using an extrusion hopper as in U.S. Pat. No. 2,681,294 and drying each layer after it is coated.

The composition of the cushioning layer can be selected from a range of polymeric compositions provided only that they have the required physical properties. The principal requirement is that the cushioning layer should have a relatively low Tg, namely, below about 20° C. It is a rubbery polymer which does not shrink or recover elastically to any substantial degree when heated in the standard test. This involves stretching the sheet material 100 percent in area by vacuum thermoforming and bonding to a metal panel. Linear cuts are then made across the strain line of the sheet material and the panel is heated to 93° C. (200° F.) for one hour. The amount of peel back from the cut provides a measure of the elastic recovery of the sheet material. A low degree of peel back is desirable.

Rubbery polymers of low Tg which are non-crosslinked have the lowest tendency toward elastic recovery when heated and are, therefore, preferred for the cushioning layer in this regard. However, at least a low crosslink density may be desirable for other reasons and is permissible, provided that the Tg remains below about 20° C.

An example of a polymer which can have a low degree of crosslinking is a polyurethane which is mixed with an aminoplast crosslinking or curing agent such as a melamine resin, of the types disclosed in U.S. Pat. No. 4,719,132 or U.S. Pat. No. 4,147,679. An especially preferred cushioning layer composition of this kind comprises the same kind of polymer as is present in the paint composition of the sheet material but, of course, omitting the pigment.

The topcoat layer in the sheet material of the invention, including both the cushioning layer and a crosslinked layer, if present, is transparent. Preferably, to provide the highest quality of gloss, distinctness of image and of "flop" or geometric metamerism, when a metallic paint is used, the topcoat layer is entirely clear. It can, however, if desired contain a small amount of colorant provided that it remains transparent.

As previously stated, the preferred surface for the transparent topcoat layer comprises a crosslinked polymer of relatively high Tg. Preferably it is formed by mixing a two-component crosslinking composition such as a polymeric polyol solution and a diisocyanate solution which react after mixing to form a crosslinked polyurethane. In coating this composition the preferred procedure is to mix the reactive components just before coating the mixture on the paint layer. The components are fed to a mixing zone and the mixture is extruded in laminar flow through the narrow horizontal extrusion slot of a coating hopper within less than about 50 seconds after being formed in the mixing zone.

The sheet material of this invention includes a flexible carrier film. The latter preferably comprises an essentially planar, self-supporting, stretchable, thermoplastic polymeric film. It can be transparent, translucent or opaque. If desired, it can be matched in color to the color of the protective and decorative paint layer by incorporation of a colorant.

Suitable materials for the carrier film include stretchable thermoplastic polymeric films having heat softening and tensile elongation properties which adapt it to use in the thermoforming process. Preferred are those films known to be useful in thermoforming and/or vacuum-forming techniques, such as polyvinyl chloride, polyvinyl acetate, ABS (acrylonitrile-butadiene-styrene) resins, polyethylene and polypropylene. Useful materials include the polyacrylate blends with copolyesters described in U.S. Pat. No. 4,246,381, and the copolyesters derived from aromatic polyesters and glycol polyesters described in U.S. Pat. No. 4,287,325. Blends of rubber-modified styrene-maleic anhydrides with polycarbonates and/or polyesters are also useful, as are blends of poly(ether-esters) and polyesters. Particularly preferred carrier film polymers exhibit a tensile elongation at break of at least about 40% when measured in accordance with ASTM D-638. Highly preferred is a blend of copolyesters based on poly(1,4-cyclohexylenedimethylene terephthalate) and rubber-modified styrene-maleic anhydride copolymers as described in U.S. Pat. No. 4,582,876. Another preferred carrier film is the highly flexible film made from a blend of poly(etheresters) and polyesters. The carrier film can include fillers, UV absorbers, plasticizers, colorants, antioxidants, etc. known to be useful in polymeric films. plasticizers, colorants, antioxidants, etc. known to be useful in polymeric films.

The paint layer of the sheet material contains in addition to a polymeric binder, a colorant or light reflective flake or both and, optionally, other addenda such as surfactants, coalescing agents and the like. The light-reflective flakes can be those conventionally employed in paints, particularly those employed in automotive finish paints. These include metallic flakes such as aluminum flake, copper flake, bronze flake, copper bronze flake, nickel flake, zinc flake, magnesium flake, silver flake, gold flake, and platinum flake and other flakes such as mica, glass, coated mica, coated glass and aluminum-coated polyester film fragments. Mixtures of two or more types of such flakes can also be used.

Conventional paint colorants can be employed alone or in combination with such flakes, including inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others.

The film-forming polymeric binder for the paint composition can comprise any of the film-forming polymers conventionally used as binders in flexible and stretchable basecoat compositions. Particularly useful are acrylic polymers, polyesters, including alkyds, and polyurethanes. Examples of such binders and methods for the preparation thereof are described in U.S. Pat. Nos. 4,681,811; 4,403,003 and 4,220,679.

Water-based basecoats in color plus-clear compositions are disclosed in U.S. Pat. No. 4,403,003, and the resinous compositions used in preparing these basecoats can be used in the practice of this invention. Also, water-based polyurethanes such as those disclosed in U.S. Pat. Nos. 4,147,679 and 4,719,132 can be used as the resinous binder in the paint layer.

Preferred paints of those described above have been used on external automobile parts made from deformable polyurethanes. Such paints stretch and deform without cracking or delaminating.

The paint layer preferably has a thickness in the range of from about 0.012 to 0.080 millimeters. A particularly preferred mean thickness is in the range of from about 0.020 to 0.060 millimeters.

The heat softening and tensile elongation properties of the paint layer must be compatible with those of the carrier film so as to permit symmetrical elongation. By symmetrical elongation it is meant that the sheet material can undergo substantial elongation by the application of stretching forces without splitting, crazing or delaminating of the paint layer. Applicant's sheet material provides outstanding symmetrical elongation, which results in part from the thickness and thickness uniformity of the layers. The ratio of the mean thickness of the paint layer to the mean thickness of the support preferably is in the range of 1.00 to 0.04 and more preferably in the range of 0.50 to 0.08. Sheet materials having thickness ratios of about 0.2 are especially preferred for obtaining substantial symmetrical elongation without splitting, crazing or delaminating.

Crosslinked transparent topcoat compositions for use with basecoats are well known in the art. Especially useful are compositions comprising crosslinkable polyols such as polyester polyols, polyurethane polyols and acrylic polyols, admixed with polyisocyanate curing agents. To prepare the sheet materials of the invention, the topcoat composition is extruded through a slot onto the paint layer of the sheet material. This laminar flow method permits the coating of a topcoat in one or more passes and results in improved smoothness, excellent gloss and distinctness of image, as compared with topcoats applied by spraying and other non-laminar flow techniques. The topcoat is then dried to a tack-free state.

When loss of gloss is not a problem, as when the paint layer contains no metallic flakes or the stretching of the sheet material is minimal, the total topcoat thickness can be relatively small, e.g., as low as 0.025 mm (1 mil). However, when a metallic paint layer is used and the sheet material must be stretched substantially, the dried topcoat layer has a thickness of at least about 0.1 millimeter, preferably of at least 0.125 millimeter. Highly preferred is a clear layer having a dried thickness of at least 0.15 millimeter. Clearcoat thickness up to 0.25 millimeter or even higher can be achieved using the coating techniques described above.

The carrier film, paint layer and topcoat layer have heat softening and tensile elongation properties which render the sheet material suitable for use in the thermoforming process and which are mutually compatible so as to permit symmetrical elongation, whereby the sheet material can undergo substantial elongation by the application of stretching forces without crazing or delamination of the basecoat and topcoat layers. The carrier film, paint layer and topcoat layer are of sufficiently uniform character that the sheet material exhibits substantially the same uniformity of appearance before and after the thermoforming process.

An adhesion-promoting tie-layer is coated on the carrier film before the basecoat in preferred embodiments of the invention and provides improved bonding strength and reduces the risk of delamination. Suitable tie-layers can be formed from compositions comprising an adhesion promoting species and optionally a suitable solvent. Useful adhesion promoting species include polymers derived from acrylonitrile, vinylidene chloride, and acrylic acid; polymers derived from methylacrylate, vinylidene chloride and itaconic acid; cellulose nitrate, and a variety of commercially available adhesion promoting species, for example, those known under the trade designations FORMVAR 7/95, FORMVAR 15/95, BUTVAR B-98 and BUTVAR B-72, sold by Monsanto, MOBAY M-50 sold by Mobay, VINAC B-15 sold by Air Products, ELVACITE sold by DuPont, and LEXAN sold by General Electric. Suitable solvents include methylethyl ketone, methylene chloride, tetrahydrofuran, toluene, methyl cellosolve, methanol, ethanol, propanol, butanol, mixtures thereof and the like. The adhesion promoting layer preferably has a thickness not greater than about 0.0025 millimeter. The thickness preferably is substantially less than the thickness of the basecoat. For example, the basecoat preferably has a thickness at least 8 times the thickness of the adhesion promoting layer.

It should be noted that the thermoforming process typically involves stretching in all directions rather than just a longitudinal stretching of the sheet material. Thus, the sheet material is extended in area. Prior to thermoforming, the sheet material can be said to be in an unextended state in which it is substantially unstressed. By the thermoforming process, it is softened to a substantially plastic state and plastically extendable to an extended state. The sheet material of this invention is capable of extension to an extended area at least 50% greater than the area of the unextended state.

The sheet material of the invention has a substantially uniform quality and appearance both in the unextended and extended states of the sheet material. This means that in the unextended state it is essentially free of coating defects such as lines, dimples, bubbles, streaks, banding, repellencies, colorant agglomerations and the like when visually examined under roomlight, on a light box and in sunlight. Furthermore, this means that the sheet material provides a commercially acceptable finish when applied to exterior automobile panels. Moreover, a given unextended sheet material can be stretched different degrees in different areas, or stretched in some areas and not in other areas and the uniformity of appearance in all areas, including distinctness of image, gloss, optical density, and flop remains substantially the same.

The sheet material of this invention preferably exhibits an initial distinctness of image (DOI) of at least 80 as measured by ASTM TEST E-430. Such measurements, for example, can be made on a HUNTERLAB MODEL D47R-6 DORIGON GLOSSMETER. Preferred sheet materials of the invention exhibit an initial DOI of at least 85, and more preferably of at least 90 when measured by this technique.

The sheet material of this invention exhibits an initial 20° gloss of at least 80 when measured in accordance with ASTM TEST D-523. Preferred sheet materials of this invention exhibit a 20° gloss of at least 85 initially and more preferably of at least 90 when measured by this method. When stretched up to 50 percent more than the original area the gloss remains at least about 80.

The sheet material of this invention preferably exhibits an average surface roughness (Ra) of less than 0.4 micrometer when measured by conventional surface roughness measuring techniques known in the art. For example, Ra can be measured using a scanning type stylus instrument having a skidless probe and a cutoff of about 0.0762 cm (0.030 in). One such instrument is the Micro-Topographer ® sold by Federal Products Corporation. Particularly preferred sheet materials of this invention exhibit an average surface roughness of less than 0.2 micrometer and more preferably of less than 0.1 micrometer.

Laminar flow coating techniques are required in manufacturing the sheet material of the invention. These include direct extrusion onto the support by use of an extrusion hopper functioning to apply the coating composition by a bead coating or a stretch-flow coating mechanism, extrusion of the coating composition through a slot with subsequent travel down the slide surface of a slide hopper or subsequent free fall in a curtain coating process and curtain coating processes in which the curtain is generated by the use of an overflow weir. The critical aspect of the coating process is its ability to provide a defect-free coating with a very high degree of uniformity of layer thickness. In particular, the process must provide such a result even with a thick coating of the crosslinking clearcoat composition.

The use of precision coating processes in the production of the sheet material—such as the use of high precision extrusion hoppers—provides superior sheet materials of the invention. The coating operation should be conducted with exacting control of all critical parameters to ensure the high degree of thickness uniformity and the freedom from coating defects that characterize the preferred sheet materials of this invention. By control of both thickness uniformity and coating defects, sheet material is produced which is capable of undergoing the rigors of the thermoforming process and yielding a product with the very high quality demanded of an automotive finish.

Laminar flow extrusion coating hoppers such as disclosed in the patent to Beguin, U.S. Pat. No. 2,681,294, are particularly effective devices for use in the process of this invention. Such devices are well-adapted for use with shear-thinning compositions typical of the paint compositions hereinbefore described. In such hoppers, transverse pressure gradients are minimized and almost all pressure drop across the slot is in the direction of coating. While applicant does not wish to be bound by any theoretical explanations, it is believed that such features contribute to the excellent results achieved with an extrusion hopper, especially in the coating of paint compositions containing light reflective flakes and in the coating of crosslinking clearcoat compositions.

Although laminar flow coating and, especially, coating by means of a narrow slot extrusion hopper are preferred, benefits of the invention can be obtained even when the sheet materials are made by other coating methods such as spraying or reverse roll coating.

The invention is further illustrated by the following examples of the invention and comparative examples:

EXAMPLE 1

A carrier film was prepared from a blend described in U.S. Pat. No. 4,582,876 as follows:

A mixture of 55:45 parts by weight of polyester (1) and Dylark ® Styrene Copolymer 600 was compounded by extrusion. Polyester (1) was derived from terephthalic acid, 19 mole % ethylene glycol and 81 mole % 1,4-cyclohexanedimethanol. Dylark ® Styrene Copolymer 600 is a rubber modified styrene-maleic anhydride copolymer available from ARCO Chemical Company, a division of Atlantic Richfield Company.

The blend was heated to 260°–290° C. and extruded through a die into a nip comprising two temperature-controlled chrome plated stainless steel rollers. The extruded web was then cooled on a chilled roller. The thermoplastic film had a mean thickness of about 0.20 mm and a maximum thickness deviation of less than 0.02 mm.

The carrier film prepared as described above was thereafter coated with a thin tie-layer solution (diluted to 5% solids before coating). Before being diluted the composition comprised 75% water, 10% acrylic resin, 10% urethane resin, 1% methylpyrrolidone, 1% diethyleneglycol monobutyl ether, less than 1% ethylene glycol monohexyl ether, less than 1% N, N-dimethyl ethanolamine and above 0.05% "Fluorad FC 170" surfactant (sold by 3M Company). The diluted composition was coated through a 0.13 millimeter extrusion coating hopper slot and dried at 40°–90° C. All percentages are by weight. The dry coverage was 0.54 g/m$^2$, the dry thickness being 0.0005–0.001 mm.

The metallic paint composition described in Table I below was metered from a nitrogen gas pressurized vessel through a coating hopper extrusion slot having a width of 0.25 millimeter onto the carrier film moving at a speed of 8 m/min. The coating roll was cooled with recirculating water to reduce the propensity of the coating to streak and to minimize precipitate formation on the hopper lip. The coating method and apparatus were substantially as described in U.S. Pat. No. 2,681,294 and included means for maintaining a pressure differential across opposite surfaces of the coating ribbon. The coating was dried at 27°–80° C. to a dry coverage 43 g/m$^2$ and 0.04 mm (1.5 mils) thickness in a plural-stage, continuous flat bed drying apparatus supplied with low velocity, moderately humid, warm air streams, substantially as disclosed in the Fronheiser et al application Ser. No. 166,083, cited above.

TABLE I

| Metallic Paint Composition | |
| --- | --- |
| Ingredient | Approx. % Weight |
| Deionized water | 50 |
| Urethane resin | 25 |
| Aluminum paste | 5 |
| Ethylene Glycol Monohexyl Ether | 5 |
| N-Methylpyrrolidone | 5 |
| Diethylene Glycol Monobutyl Ether | 1 |
| N,N-Dimethyl Ethanolamine | 1 |
| Xylene | 1 |
| Aliphatic Solvent Naphtha | 1 |
| Isopropyl Alcohol | <1 |

The dried, paint-coated web was wound on a take-up roll and again drawn through a coating station to form over the paint layer a uniform layer of a non-pigmented, cushioning layer having essentially the same composition as the paint composition of Table I but containing no aluminum paste or other pigment. The rubbery dried clear cushioning layer had a thickness of 0.06 mm and a Tg of about 30° C.

Thereafter, a crosslinked clear topcoat was coated and dried in the same manner over the non-pigmented layer, using the two-compound polyurethane composition of Table II.

TABLE II

| Clear Topcoat Composition | |
| --- | --- |
| | Approx. % Weight |
| Component A | |
| Urethane Resin (polyol) | 60 |
| Toluene | 40 |
| Benzotriazole | 1 |
| (diluted to 51% solids with acetone | |
| Component B* | |
| Polyfunctional aliphatic isocyanurate resin based on 1,6-hexamethylene diisocyanate | 100 |

*Available as Desmodur N-3300 from Mobay

Components A and B were mixed by means of an in-line mixer before reaching the coating hopper as described in the Hayward et al patent application Ser. No. 189,090, cited above. The composition flowed from the mixer directly to the same type of extrusion coating hopper as used for the paint layer and was extrusion coated, in a single pass, through the narrow extrusion slot of the hopper. The web having on its surface the wet topcoat layer was then passed directly to a drying chamber where the topcoat layer was dried and cured by exposure to low velocity streams of warm, moderately humid air in a series of stages of successively increasing temperatures, the drying and curing procedure being substantially as disclosed in the Fronheiser et al application Ser. No. 166,083 cited above. The dried clear topcoat layer applied in this single pass had a thickness of 0.06 mm and had a Tg of about 60° to 70° C. An aqueous acrylic pressure sensitive adhesive layer was coated and dried the on backside of the carrier film.

COMPARATIVE TEST A

Another sheet material was prepared in the same manner except that this topcoat consisted entirely of the crosslinking clear topcoat composition of Table II. The dry thickness of the topcoat was 0.06 mm.

ADDITIONAL EXAMPLES AND COMPARATIVE TESTS

Thereafter Examples 2-7 of the invention and comparative tests B, C and D were prepared substantially as described in Example 1 except that different thicknesses of the crosslinked clear layer and of the cushioning layer were coated. Table III below lists the specific dry thicknesses. In this table "CL" means the rubbery cushioning layer and "XL" means the crosslinked clear layer.

A sample of each sheet material was heated by infrared heaters to a temperature of about 135° C. and then drawn by vacuum thermoforming into contact with a 7.5 × 30 cm inclined metal panel and adhesively bonded thereto. As they were drawn down onto the inclined panels, the samples stretched by an amount proportional to the distance along the panel, the area at the top of the panel (Top) having little or no stretch, and an area half-way down the panel (Center) having a stretch of about 70 percent.

Gloss and DOI measurements made at the top and center areas on each panel indicate the effect of stretching on the surface characteristics of the sheet material. Measurements were also made at the bottom of the panel. However, since the degree of stretch in that area (about 200%) exceeded normal intended usage of the sheet material, the measurement for the bottom are not included in the results.

Gloss was measured by the ASTM D-523 method mixing a Hunter 20-Degree ASTM Glossmeter, and Distinctness of Image (DOI) was measured by the ASTM Test E-430 method using a Hunterlab Model D47R-6 Dorigon Glossmeter.

The results are shown in Table III.

TABLE III

| Example or Test No. | Layer Thickness (mm) CL | XL | Total Clearcoat Thickness | Gloss Top | Center | % Loss |
|---|---|---|---|---|---|---|
| 1 | 0.06 | 0.06 | 0.12 | 92 | 88 | (4.3) |
| Comp. A | | 0.06 | 0.06 | 92 | 56 | (39) |
| 2 | 0.08 | 0.03 | 0.11 | 84 | 75 | (11) |
| 3 | 0.12 | 0.03 | 0.15 | 86 | 80 | (7) |
| Comp. B | 0.04 | 0.03 | 0.07 | 89 | 57 | (36) |
| 4 | 0.04 | 0.06 | 0.10 | 92 | 82 | (11) |
| 5 | 0.08 | 0.06 | 0.12 | 86 | 86 | (0) |
| Comp. C | | 0.06 | 0.06 | 89 | 50 | (44) |
| 6 | 0.12 | | 0.12 | 88 | 74 | (16) |
| 7 | 0.16 | | 0.16 | 89 | 78 | (12) |
| Comp. D | 0.08 | | 0.08 | 89 | 57 | (36) |

The data show that when the total thickness of the clearcoat exceeds 0.1 mm a dramatic improvement in retention of gloss is observed. Although not shown in the table, retention of DOI also improves significantly when the total thickness of the clearcoat increases. It is evident that these improvements occur when the total thickness of the clearcoat exceeds 0.1 mm, whether the layer comprises a combination of crosslinked and cushioning layers, as in Examples 1-5, or is formed of a low Tg polymer alone, as in Examples 6 and 7.

EXAMPLES 8-16

Examples 8-16 were prepared as described in Example 1 such that the cushioning layer, CL, and the crosslinked topcoat layer, XL, had the respective dry thickness listed in Table IV below.

Each sheet material was bonded by a vacuum thermoforming process to an inclined metal plate (substrate) in such a manner as to provide a regular increase in thermoforming stretching along the length of the incline.

Thereafter, a linear cut perpendicular to the strain gradient line, 5 cm in length and having 1 cm perpendicular cut across each end, was made with a razor through the laminate to the substrate at a point representing 100% of the maximum strain. After being cut, each sample was subjected to a high temperature test which consisted of holding the sample at 93° C. for one hour. Each sample, after being heated, was evaluated by measuring the width of the middle of the cut. The wider the cut, the stronger was the tendency of the thermoformed sheet material toward elastic recovery.

Results are shown in Table IV.

TABLE IV

| Example | Layer Thickness (mm) CL | XL | Width of Cut after High Temperature Exposure (mm) |
|---|---|---|---|
| 8 | 0.11 | 0 | 1.4 |
| 9 | 0.08 | 0.03 | 1.6 |
| 10 | 0.04 | 0.06 | 8.4 |
| 11 | 0 | 0.09 | >>9.4 |
| 12 | 0.16 | 0 | 1.7 |
| 13 | 0.11 | 0.03 | 1.4 |
| 14 | 0.08 | 0.06 | 7.5 |
| 15 | 0.04 | 0.09 | 9.4 |
| 16 | 0 | 0.12 | >>9.4 |

These test results indicate that the cushioning layer, whether used alone as in Examples 8 and 12 or together with a crosslinked, higher Tg layer, as in Examples 9, 10, and 13-15, reduces the tendency toward elastic recovery when the sheet material stretched and bonded to a metal panel is subjected to elevated temperature. The data also indicates that the greatest improvement occurs when the crosslinked layer is considerably thinner than the cushioning layer as in Examples 9 and 13.

The invention has been described in detail with particular reference to preferred embodiments thereof, but it will be understood that variations and modifications can be effected within the spirit and scope of the invention.

What is claimed is:

1. A protective and decorative sheet material for use in a thermoforming process in which it is stretched and bonded to a three-dimensional substrate, said material comprising:

a flexible and stretchable, thermoformable polymeric carrier film;

a stretchable, thermoformable paint layer adhered to one surface of said carrier film; said paint layer comprising a polymeric binder and a colorant or substantially flat light reflective flakes or both;

a transparent polymeric topcoat overlying said paint layer, said topcoat comprising (a) a rubbery cushioning layer of a stretchable and thermoformable polymeric composition which is non-crosslinked or of low crosslink density and has a glass transition temperature below 20° C. and (b) a crosslinked surface layer of higher glass transition temperature; and said sheet material having an unextended state prior to being thermoformed; said sheet material being heat softenable to a state in which it is thermoformable over irregular surfaces to an extended state having an area at least 50% greater than that of the unextended state.

2. The sheet material of claim 1 wherein said carrier film is of substantially uniform thickness.

3. The sheet material of claim 2 wherein the paint layer contains light reflective flakes and the thickness of the topcoat is at least about 0.1 millimeter.

4. The sheet material of claim 3 wherein the flakes are metallic flakes.

5. The sheet material of claim 1 wherein the crosslinked layer is thinner than the cushioning layer and has a glass transition temperature of at least about 40° C.

6. The sheet material of claim 5 wherein the surface layer is a clear layer of a crosslinked polyurethane.

7. The sheet material of claim 6 including a pressure-sensitive adhesive layer on the opposite side of said carrier film from said paint layer.

8. The sheet material of claim 7 including a thin adhesion promoting layer between said carrier film and said paint layer.

9. The sheet material of claim 1 wherein said carrier film comprises a blend of copolyesters based on poly(1,4-cyclohexylenedimethylene terephthalate) and styrene maleic anhydride copolymers.

10. The sheet material according to claim 1 wherein the paint layer contains no flakes and the thickness of the topcoat is less than 0.1 millimeter.

11. The sheet material of claim 1 wherein the topcoat has a thickness of at least 0.1 millimeter, said topcoat comprising (a) a cushioning layer formed of a non-pigmented polymer of substantially the same composition as the polymeric binder of the paint layer and (b) overlying the cushioning layer a clear crosslinked polymeric layer which is thinner than and of higher glass transition temperature than the cushioning layer.

* * * * *